United States Patent
Emrich et al.

(10) Patent No.: US 8,238,900 B2
(45) Date of Patent: Aug. 7, 2012

(54) MANAGEMENT OF ANTICIPATED DATA OUTAGES IN A PUSH-TO-X COMMUNICATION SYSTEM

(75) Inventors: John E. Emrich, Bartlett, IL (US); Kevin G. Donnellan, North Brunswick, NJ (US); Jeffrey C. Smolinske, Schaumburg, IL (US)

(73) Assignee: Motorola Mobility LLC, Libertyville, IL (US)

( * ) Notice: Subject to any disclaimer, the term of this patent is extended or adjusted under 35 U.S.C. 154(b) by 1238 days.

(21) Appl. No.: 11/848,206

(22) Filed: Aug. 30, 2007

(65) Prior Publication Data

US 2009/0061904 A1 Mar. 5, 2009

(51) Int. Cl.
*H04W 24/00* (2009.01)
*H04W 36/00* (2009.01)
*H04B 7/00* (2006.01)

(52) U.S. Cl. .................... 455/425; 455/437; 455/518
(58) Field of Classification Search .................. 455/437, 455/456.6, 519, 518, 412.1, 412.2, 517, 423, 455/424, 425
See application file for complete search history.

(56) References Cited

U.S. PATENT DOCUMENTS

| | | | | |
|---|---|---|---|---|
| 5,086,507 A * | 2/1992 | Mela | ............................... | 455/509 |
| 6,496,484 B1 * | 12/2002 | Suzuki | ............................ | 370/254 |
| 7,522,584 B2 * | 4/2009 | Kautz et al. | .................... | 370/354 |
| 7,532,903 B2 * | 5/2009 | Baik | ................................ | 455/458 |
| 7,676,224 B1 * | 3/2010 | Bellovin | ........................ | 455/423 |
| 2004/0193762 A1 * | 9/2004 | Leon et al. | ...................... | 710/52 |
| 2004/0264476 A1 * | 12/2004 | Alarcon et al. | ............ | 370/395.52 |
| 2005/0143135 A1 * | 6/2005 | Brems et al. | .................... | 455/564 |
| 2005/0227691 A1 * | 10/2005 | Pecen et al. | ................. | 455/435.2 |
| 2005/0266869 A1 | 12/2005 | Jung | | |
| 2006/0003775 A1 * | 1/2006 | Bull et al. | ................... | 455/456.1 |
| 2006/0025122 A1 * | 2/2006 | Harris et al. | ................... | 455/419 |
| 2006/0089131 A1 | 4/2006 | Huang | | |
| 2006/0111134 A1 | 5/2006 | Mills | | |
| 2006/0116149 A1 * | 6/2006 | Dunn et al. | .................... | 455/518 |
| 2007/0021136 A1 * | 1/2007 | Allen | ............................. | 455/518 |
| 2007/0049311 A1 * | 3/2007 | Lindoff et al. | ................. | 455/515 |

(Continued)

FOREIGN PATENT DOCUMENTS

WO    WO 2006024307 A1 *    3/2006

OTHER PUBLICATIONS

Open Mobile Alliance, Ltd. "OMA-TS_PoC-UserPlane-V1_0-20051006-C", Oct. 6, 2005, Candidate Version 1.0, 167 pages.

*Primary Examiner* — Christopher M Brandt

(57) ABSTRACT

A mobile station (129) will have the capability to detect an impending cell change and Routing Area Update (RAU) and will send a "Request Deny" message to the network via the serving cell prior to handing over. The PTT server (131) will use the Request Deny message as an indication that an inter-SGSN RAU may be occurring. The PTT server (131) will wait for the mobile station to reappear, after handover, on a new cell. If the mobile does not reappear, an inter-SGSN RAU may be assumed and the PTT server (131) will release the floor and deny the floor to all mobile stations. This action forces all mobile stations back into idle mode and prevents them from seizing the floor. The PTT server (131) will then wait for the mobile station (129) performing the RAU to reappear on a new cell before opening the floor to all mobile stations.

11 Claims, 11 Drawing Sheets

U.S. PATENT DOCUMENTS

| | | |
|---|---|---|
| 2007/0117552 A1 | 5/2007 | Gobburu et al. |
| 2007/0249351 A1* | 10/2007 | An et al. ............... 455/436 |
| 2007/0249353 A1* | 10/2007 | Kang et al. ............ 455/436 |
| 2007/0280256 A1* | 12/2007 | Forslow ............... 370/395.2 |
| 2008/0051091 A1* | 2/2008 | Phan et al. ............. 455/436 |
| 2008/0076404 A1* | 3/2008 | Jen ....................... 455/423 |
| 2008/0159235 A1* | 7/2008 | Son et al. ............... 370/332 |
| 2008/0200162 A1* | 8/2008 | Chowdhury et al. ... 455/422.1 |
| 2008/0316980 A1* | 12/2008 | Ahlen et al. ........... 370/338 |
| 2009/0081994 A1* | 3/2009 | Drobot et al. .......... 455/412.2 |

* cited by examiner

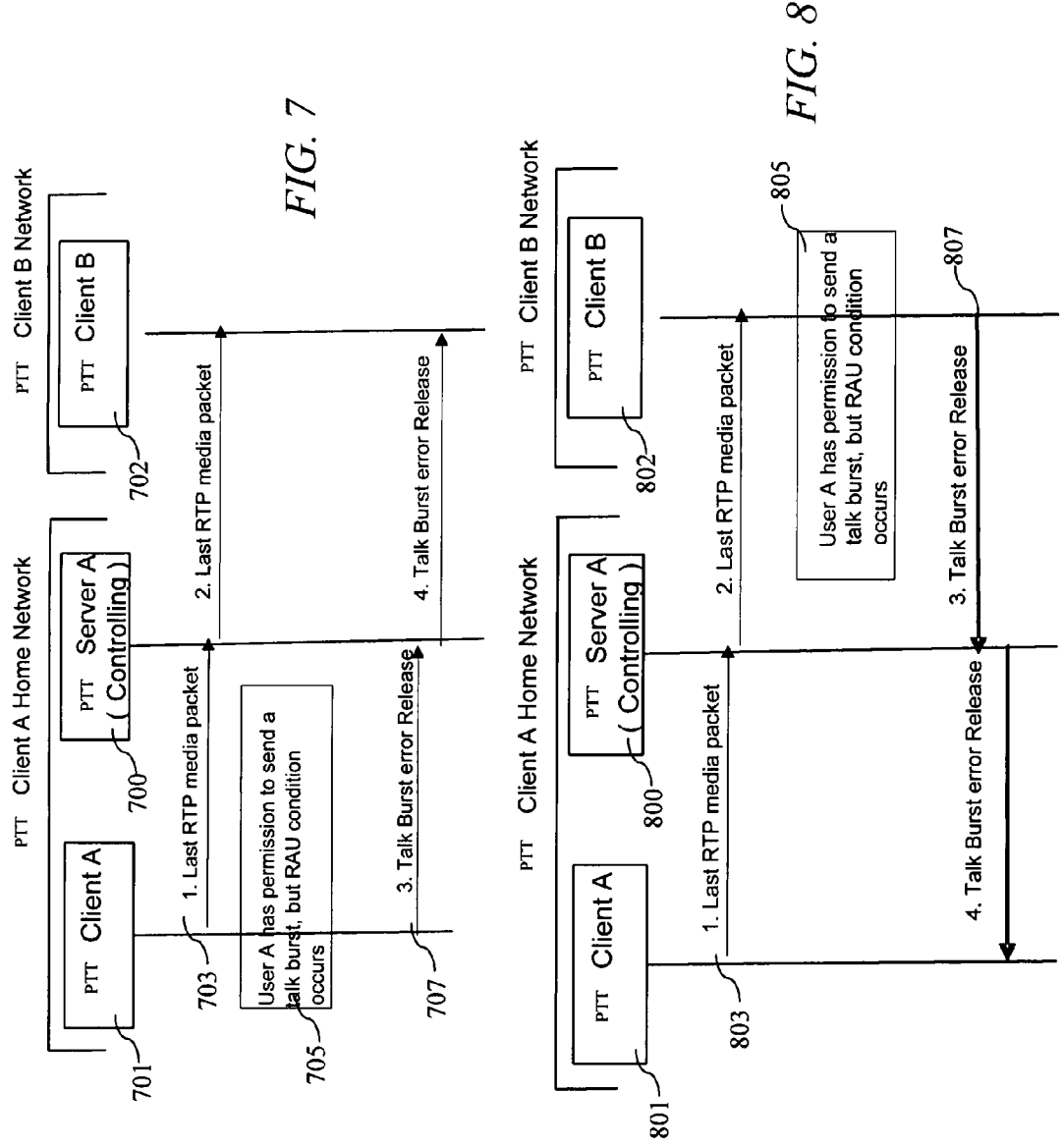

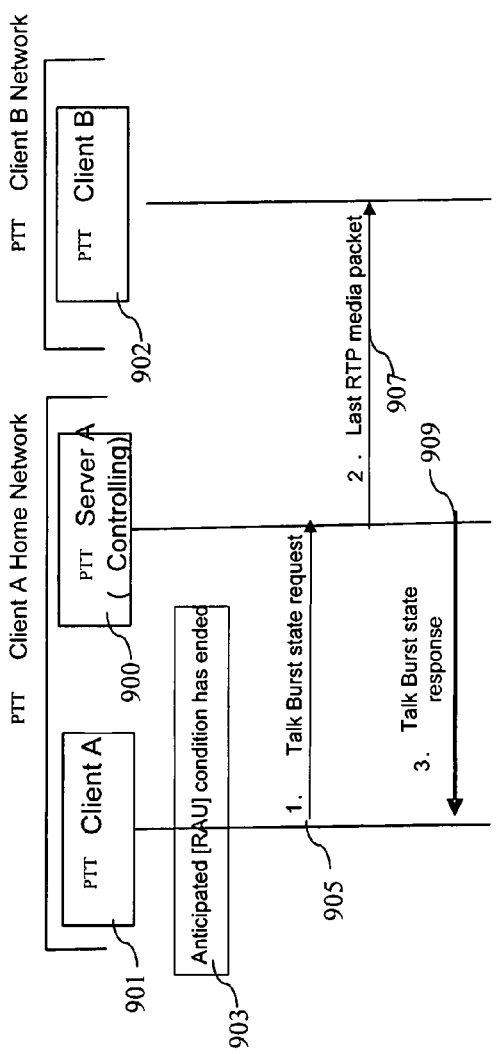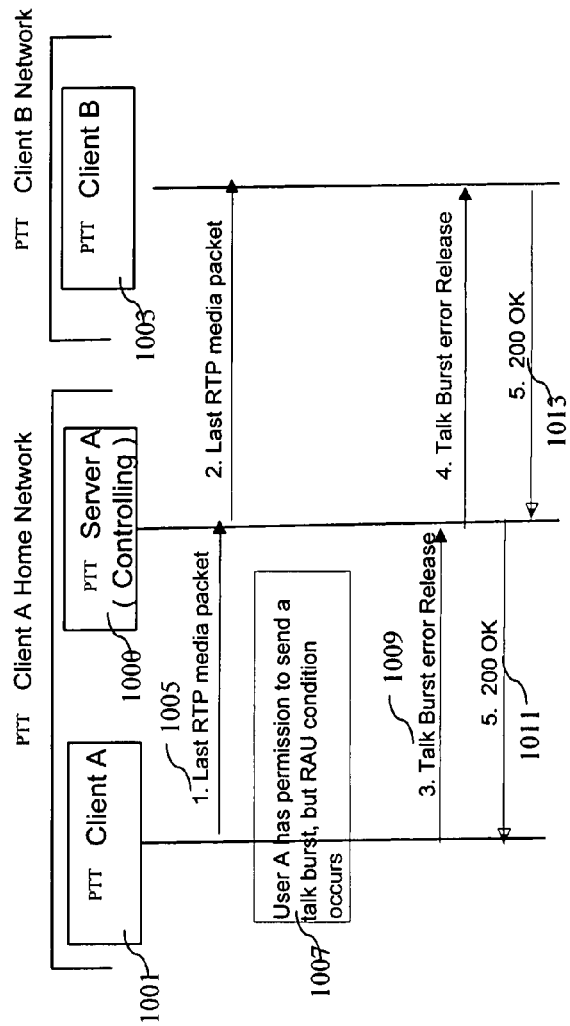

MANAGEMENT OF ANTICIPATED DATA OUTAGES IN A PUSH-TO-X COMMUNICATION SYSTEM

FIELD OF THE DISCLOSURE

The present disclosure is related to Push-to-Talk (PTT) and/or Push-to-X (PTX) communications over various wireless network technologies, and to methods and apparatuses for handling data transmission outages occurring at a mobile station due to Location Area Updates (LAU) and/or Routing Area Updates (RAU) as the mobile station, engaged in a PTT and/or PTX session, travels within or among and between various networks.

BACKGROUND

Push-to-talk (PTT) and/or Push-to-X (PTX) communication systems, may be implemented over various radio communications networks such as, but not limited to, CDMA, 3GGP™ and WLAN. Common to most such networks is the necessity of performing Location Area Updates (LAU) or Routing Area Updates (RAU) as a mobile station moves through various network radio coverage and/or controller or switch control areas. A Routing Area may be defined by a switching area or control area such as a base station controller area, and will comprise one or more base station coverage areas which are sometimes referred to as "cells."

Delays issues occurring due to RAUs or location updates may be problematic when communicating using PTT and/or PTX systems. For example, PTT over General Packet Radio Service (GPRS) may require lengthy RAU procedures causing a resulting poor performance as perceived by a mobile station user.

A GPRS RAU will occur on a mobile station's change of cell when the Routing Area changes. A GPRS core network comprises various network entity components one of which is the Serving GPRS Support Node (SGSN). The SGSN, similar to a base station, base station controller, or switch, defines a routing area within which data packets are routed by the SGSN to the appropriate mobile station when it is within the SGSN area of coverage or control. The SGSN therefore creates another location updating requirement for a mobile station moving through a GPRS network.

For example, Routing Area Update may occur Intra-SGSN or Inter-SGSN as the mobile station moves between various SGSN control areas. The delay that could occur due to such RAU procedures is approximately 2 to 4 seconds for an Intra-SGSN RAU, but may be between 8 to 30 seconds for an Inter-SGSN RAU. Intra-SGSN RAUs are therefore typically short enough such that buffering in the PTT system can significantly help hide the data outage due to the RAU from a mobile station user. Thus the overall outage duration from intra-SGSN RAUs is generally short enough to be tolerable to end users.

However, the data outages due to inter-SGSN RAUs cannot be hidden from end users and thus often generate significant end user confusion. The PTT or PTX floor is generally locked by one mobile station during the duration of the RAU. Thus for example, the user having the floor may be talking or otherwise transmitting for many seconds without realizing that the intended recipient user or users cannot hear anything or otherwise cannot receive the transmitted data.

The listening user may experience having their mobile station locked into the listening state and further being silent and non-responsive to key strokes for up to 30 seconds or more. Therefore it is understandable that an inter-SGSN RAU may significantly disrupt the flow of conversation and generally annoy both end users.

Further, if a transmitting mobile station user or talker engaged in a group call experiences an inter-SGSN RAU, all users in the call will be significantly disrupted. If any one of the listeners experiences the RAU, that listener will not only lose a large part of the conversation but will also lose a significant part of his opportunity to gain the floor.

Other network technologies may manifest similar difficulties for PTT. For systems defined by the $3^{rd}$ Generation Partnership Project 2 (3GPP2) such as CDMA2000 systems, there is the CDMA concept of a soft handoff where a mobile station may switch to another base station's coverage. The soft handoff approach of course relies upon the target base station having a channel with the desired Pseudo Random Number (PRN)/frequency being available for the handoff. If the PRN is not available, or in cases where the handoff is between base stations of different carrier networks, then a hard handoff will likely result which may result in a PTT data outage.

For 3GPP, the problem may manifest itself in inter-domain handoffs, such as between subnets when a user moves between subnets and mobile IP is enforce. In an inter-domain handoff versus an intra-domain handoff, there is usually a longer message path and more messaging causing a potential PTT data outage.

Generally hard handoffs between technologies such as, but not limited to 3GPP to GSM or WLAN to GSM and others may require hard handoffs that are disruptive and add delay to the transmission and reception of PTT and/or PTX data.

Therefore what is needed are apparatuses and methods for dealing with PTT and/or PTX data outages to improve user perception and experience when such anticipated data outages occur during PTT and/or PTX communication sessions.

BRIEF DESCRIPTION OF THE DRAWINGS

FIG. 7 is a message flow diagram for PTT clients and servers wherein a PTT client in the talking state encounters a Routing Area Update (RAU) and employs RTCP based messaging in accordance with the embodiments.

FIG. 8 is a message flow diagram for PTT clients and servers wherein a PTT client in the listening state encounters a RAU and employs RTCP based messaging in accordance with the embodiments.

FIG. 9 illustrates recovery after anticipated RAU error conditions illustrated by FIG. 7 and FIG. 8 have ended.

FIG. 10 illustrates the scenario of a talking state mobile station encountering a RAU anticipated release and using a SIP based talk burst release of the embodiments.

DETAILED DESCRIPTION

The present disclosure describes apparatuses and methods for handling PTT/PTX telephony calls or data sessions when lengthy Routing Area Update (RAU) procedures, or equivalent procedures depending on the network type, occur in various networks including, but not limited to, GSM GPRS, 3GPP™, CDMA and Wireless Local Area Networks (WLAN). Various embodiments are described including Real Time Control Protocol (RTCP) and Session Initiation Protocol (SIP) embodiments.

Figure 1:
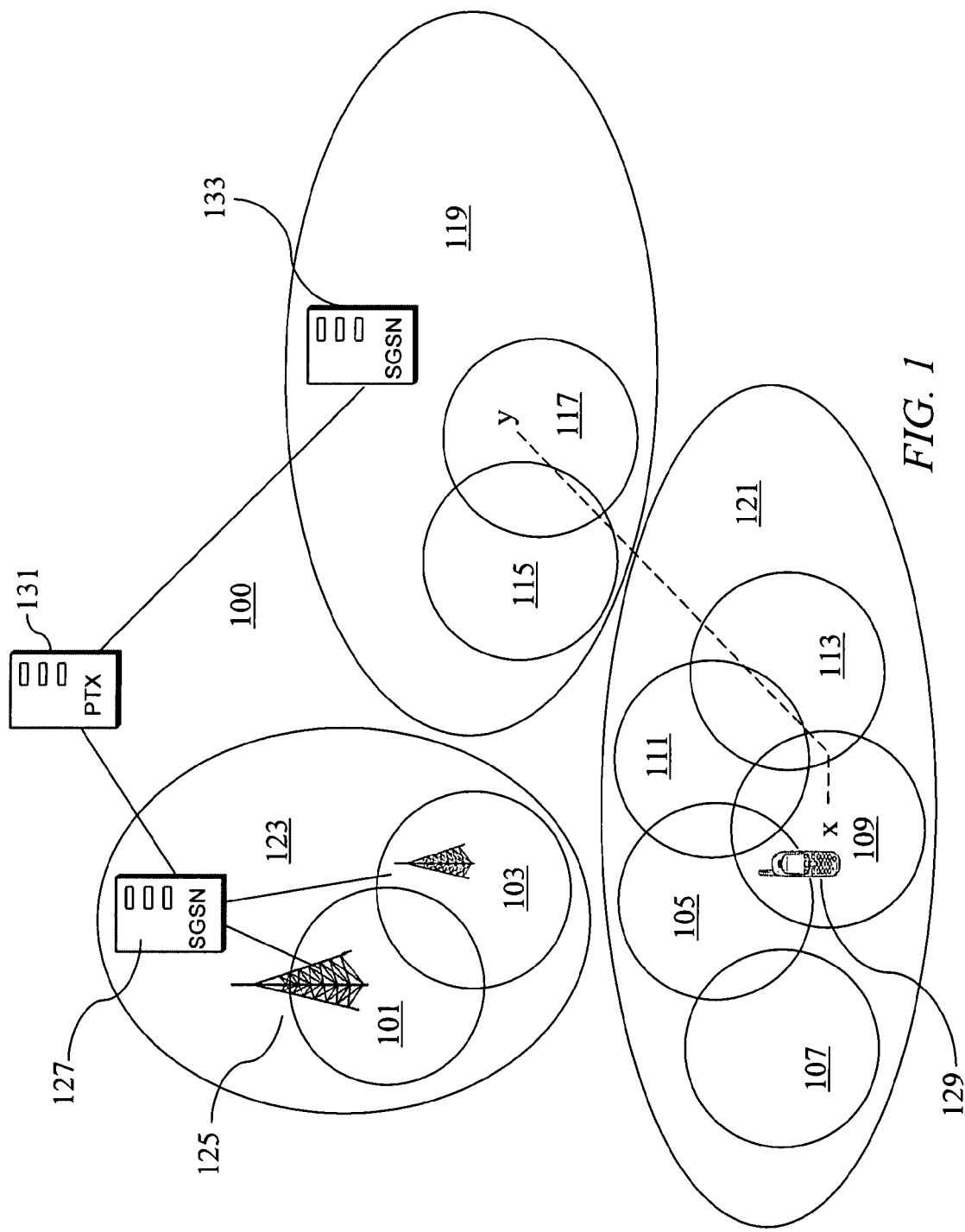
FIG. 1 is an exemplary network topology diagram illustrating Routing Area Updates (RAU) as may occur in a Push-to-Talk (PTT) and/or Push-to-X (PTX) communication system.

FIG. 1 is a diagram of a cellular communication system for use in explaining the various embodiments. As illustrated in FIG. 1, a cellular communication system 100 is comprised of a number of cells 101 through 117, each cell having a base transceiver station (BTS) 125 which establishes a radio coverage area.

Additionally, cellular communication systems have a generally hierarchical structure in which a number of cells may be grouped into a control area, and/or further grouped into a routing area (RA). FIG. 1 illustrates hypothetical RAs 119, 121, and 123 each of which contains a number of cells. Although the RAs may correspond to a Mobile Switching Center (MSC) control area, there may also be RAs associated with an SGSN, such as SGSN 127 which controls the RA 123. An MSC RA may correspond to an SGSN RA, but need not correspond in all network configurations. The handling of mobile station RA updates with respect to MSC RAs is described generally in U.S. Patent Application Publication No. 2005/0047369, application Ser. No. 10/647,727 (published Mar. 3, 2005) which is incorporated by reference herein.

It is to be understood that the geometries of radio coverage areas and RAs are typically not perfect geometries and that FIG. 1 makes use of such perfect geometries for simplicity of illustration only. In general, an RA will have boundaries that correspond to the radio coverage areas of the cells it contains, however an RA may also be distributed over non-continuous radio coverage areas. In any case, FIG. 1 illustrates that a mobile station 129 moving from a position x to a position y may cross over the boundaries of several cells and may also cross the boundaries of several RAs. For example, in FIG. 1 a mobile station moving from position x to position y will cross from RA 121 to RA 119.

As the mobile station 129 moves from position x to position y, it will perform cell reselection. As illustrated in FIG. 1, the cells reselected by the mobile station 129 may, or may not, be within the same RA as the mobile station's 129 serving cell 109. The mobile station 129 in some embodiments will be capable of determining whether a new cell will be within the same RA as the serving cell by using procedures such as those described in U.S. Patent Application Publication No. 2005/0047369. In the various embodiments the effect of RA changes on packet data communications, and particularly PTT service, is provided for as will now be described in further detail.

Returning to FIG. 1, the mobile station 129 in packet data transfer mode using a PTT service which in some embodiments may be provided by a PTX/PTT server 131, monitors the BCCH or PBCCH of one or more cells. The mobile station 129 obtains a list of the BCCH carriers that it should monitor by receiving a Neighbor Cell Description information element. The Neighbor Cell Description information element provides the mobile station 129 with the absolute radio frequency channel numbers of the particular BCCH carriers the mobile station 129 should monitor.

In the various embodiments employing GPRS and GPRS/EDGE, the mobile station 129 will have the capability to detect an impending cell change and Routing Area Update (RAU) and will send a "Request Deny" message to the network via the mobile station 129 serving cell prior to handing over to a new cell and performing a RAU. The PTT server 131 of the embodiments will use the Request Deny message as an indication that an inter-SGSN RAU, and therefore a related data outage, may be occurring. The PTT server 131 will set a timer, for example 4 to 5 seconds, and wait for the mobile station to reappear, after successful handover, on a new cell. If the mobile station does reappear, an intra-SGSN RAU may be assumed to have occurred and thus and all is well.

However, if the mobile does not reappear, an inter-SGSN RAU may be assumed, for example the mobile station 129 may have moved between an RA of SGSN 123 and an RA of SGSN 133. Therefore, for this case, the PTT server 131 will release the floor and deny the floor to all mobile stations. This action forces all mobile stations back into idle mode and prevents them from seizing the floor. The PTT server 131 will then wait for the mobile station 129 performing the RAU to reappear on a new cell. After the mobile station 129 reappears, the PTT server 131 will open the floor to all mobile stations.

Figure 2:
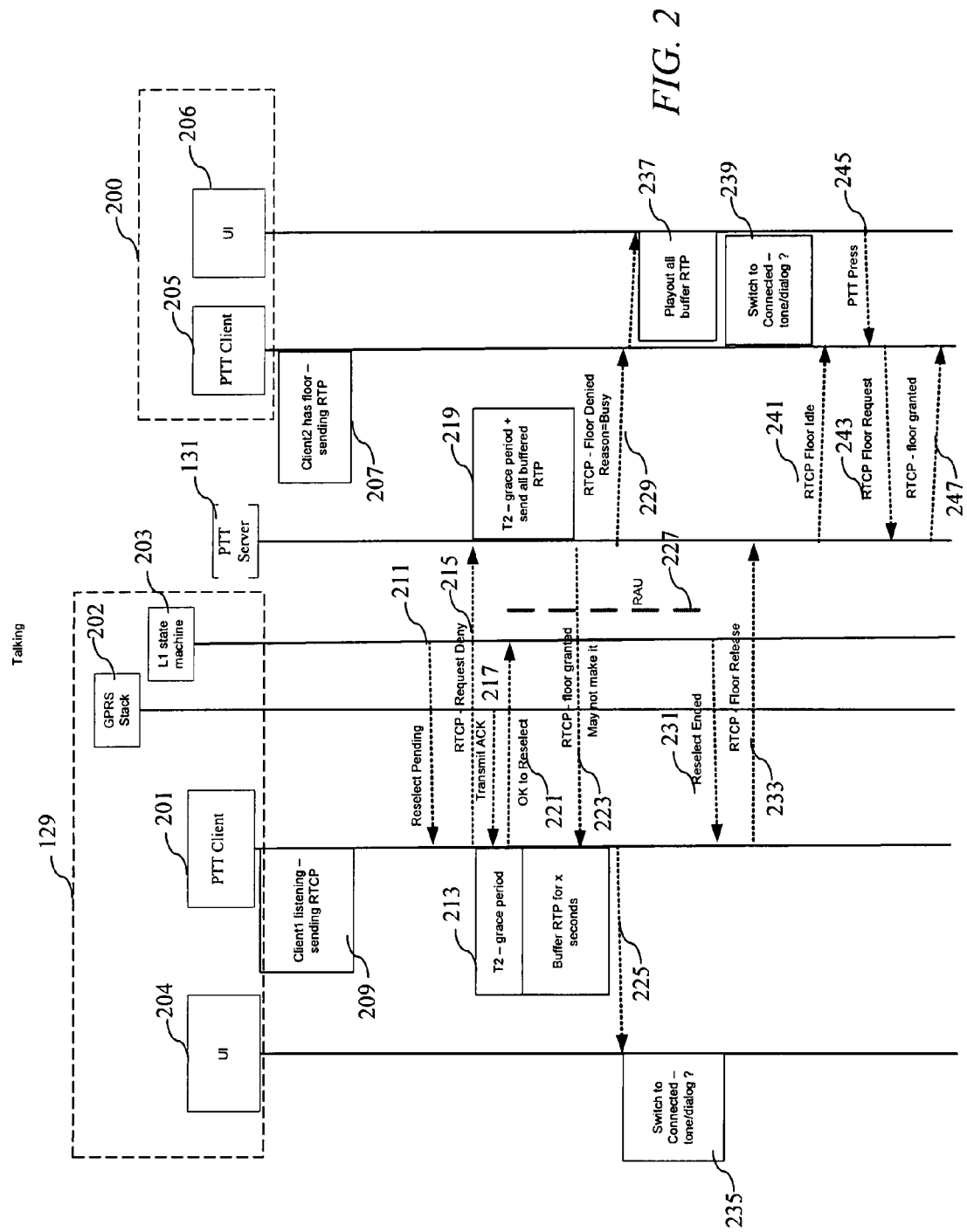
FIG. 2 is a message flow diagram illustrating message flows in a GSM GPRS network in accordance with an embodiment.

FIG. 2 provides further details of the operation described above for a GPRS network. The mobile station 129, in accordance with the embodiments, may detect an impending RAU and in response, send a Request Deny message 215 to the network. A mobile station will typically perform a cell reselection decision at or approximately every 5 seconds. It has been determined that delaying the execution of cell reselection by 100 to 200 ms will have insignificant impact on overall mobile station performance. Prior to each cell reselection a mobile station learns whether its target cell is in the same Routing Area (RA) as its current cell. The mobile station may use the procedures described U.S. Patent Application Publication No. 2005/0047369 to make the RA determination or any other appropriate procedure.

For example, if the serving cell has no Packet Common Control Channel (PCCCH), the mobile station may compare the "RA color code" of the target cell to the serving cell as described in the 3$^{rd}$ Generation Partnership Project (3GGP™) standards, specifically 3GPP TS 44.018, v7.6.0 "Technical Specification Group GSM/EDGE Radio Access Network; Mobile Radio Interface Layer 3 Specification; Radio Resource Control (RRC) Protocol" (Release 7, September 2006), which is incorporated by reference herein.

The RA color code is broadcast by a BTS such as BTS 125, in the "Sys Info 3" and "Sys Info 4" information. The mobile station 129 must read either the Sys Info 3 or Sys Info 4 on its target cell before handing over. If the RA color code in the target cell is different from serving cell RA color code, then the cells are not in the same RA and the mobile station 129 will need to perform a RAU after it reselects to the target cell.

If there is a PCCCH on the serving cell, the parameter "SAME_RA_AS_SERVING_CELL" in the Packet System Information Type 3 tells the mobile station whether or not a RAU will be required following the cell reselection. Thus if the "SAME_RA_AS_SERVING_CELL" parameter has the value 0, the cells are not in the same Routing Area and the mobile station will need to do a RAU after it reselects to the new cell. Therefore, once the mobile station Layer 1 203 decides to do a cell reselection, it determines if a RAU will be required in the new cell following the cell reselection.

If a RAU will be required, the mobile station 129 Layer 1 203 then signals a PTT client 201 of the mobile station that a cell reselection and RAU is pending via a "reselect pending" signal 211. The PTT client 201 then generates a message to send to the network, in this case the "Request Deny" message 215, and forwards the message to a GPRS stack 202 along with an indicator that this is a High Priority with Ack message. The GPRS stack 202 treats the High Priority with Ack message as special by flushing its uplink queue and then inserting the High Priority with Ack message at the front of the uplink queue.

The GPRS stack 202 then transmits the High Priority with Ack message to the network. Once all RLC blocks comprising the message have been acknowledged by the network, the GPRS stack 202 indicates so to the PTT client 201 via the "Transmit Ack" 217. The PTT client 201 then informs the GPRS Layer 1 203 to proceed with the cell reselection via the "OK to reselect" signal 221. Layer 1 203 then performs the cell reselection, which triggers the GPRS Mobility Management Layer (GMM Layer) to perform the RAU.

Mobile station 200 is a mobile station that may have been in a PTT communication with mobile station 129 at the time the mobile station 129 cell reselect began. The PTT server sets timer 219 in response to receiving the mobile station 129 request deny message 215. After elapse of timer 219, the PTT server 131 will grant the floor to mobile station 129 via RTCP floor granted message 223, and deny the floor to mobile station 200 via RTCP floor denied message 229. After the mobile station 129 completes cell reselection and the RAU, Layer 1 203 will inform the PTT client via reselect ended message 231. The mobile station 129 PTT client 201 may then release the floor via floor release message 233 and the PTT server 131 may indicate to other mobile stations, such as mobile station 200, that the floor is now idle, for example via floor idle message 241.

A subsequent floor request message 243 may then be granted by the PTT server 131 via floor granted message 247 which grants the floor request 243 made by the mobile station 200 user, via the PTT key press 245.

Figure 3:
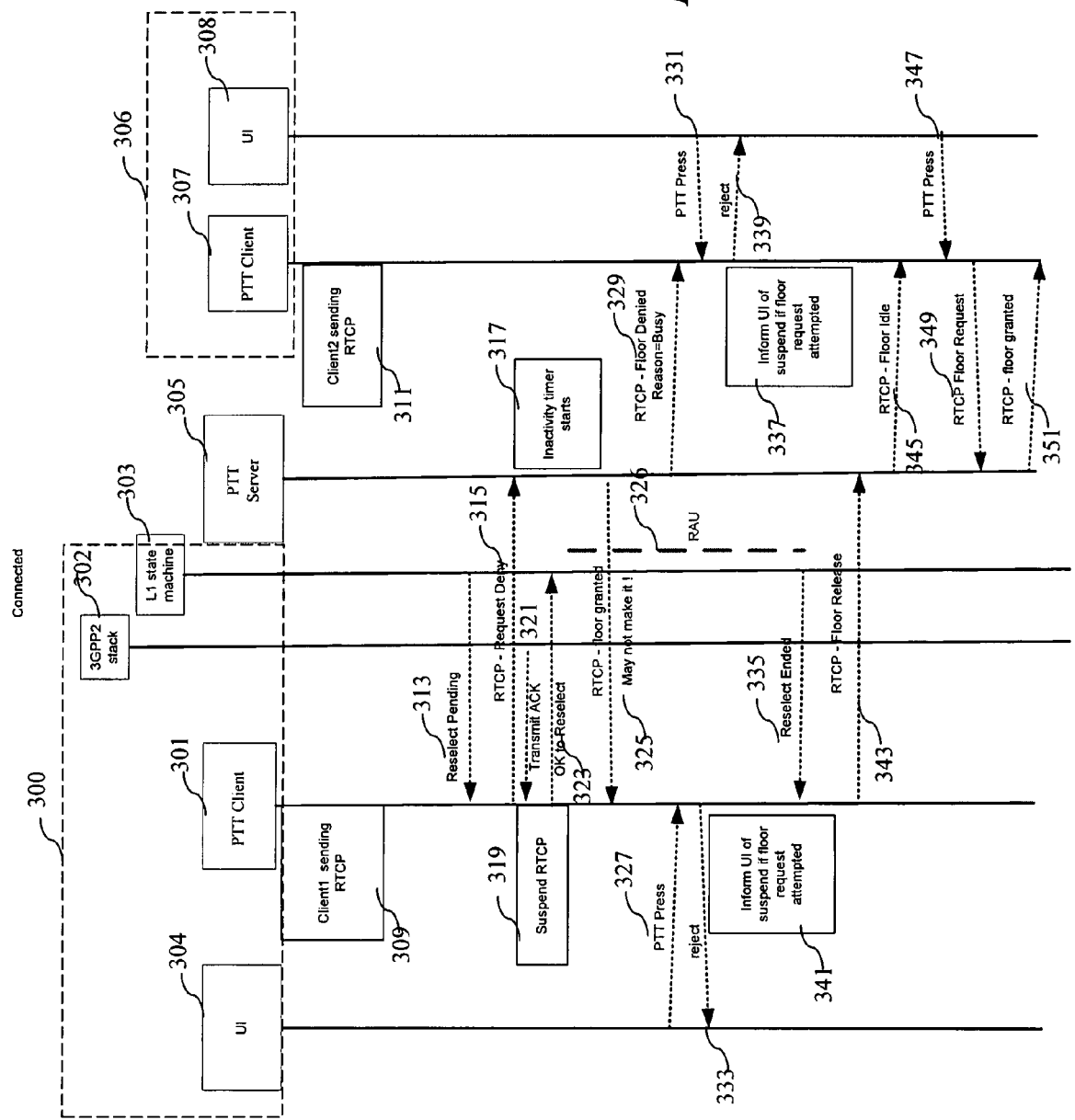
FIG. 3 is a is a message flow diagram illustrating message flows in a CDMA2000 network in accordance with an embodiment.

FIG. 3 illustrates details of an embodiment for CDMA2000™, 3GPP2 ™ networks. As was described above, a RAU/LAU represents a handoff in the packet data domain in the GSM/3GGP™ technology domain. For the 3GPP2™ domain an inter-Packet Data Serving Node (PDSN) handoff is specified, wherein a new connection is established which in turn dictates the need to establish new radio bearers for the connection. This case is similar to the GSM RAU/LAU issue where the so-called 3GPP2™ "packet zone" corresponds to a "routing area" (RA).

The details of the messaging for this case is illustrated in FIG. 3. As can be seen from FIG. 3, the messaging is similar to the case of FIG. 2. and thus, to the extent messaging is similar to FIG. 2, description of the steps is not repeated.

Figure 4:
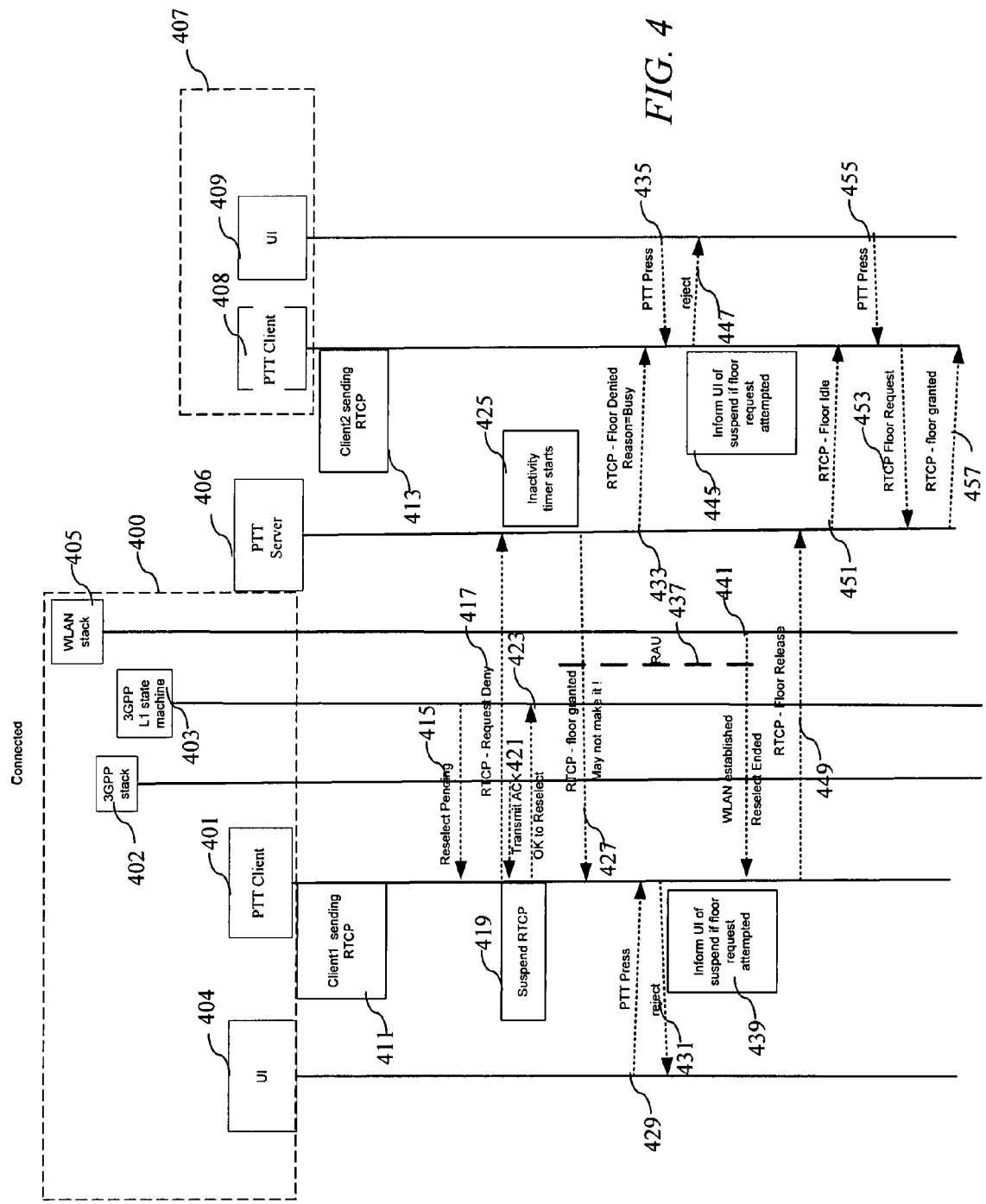
FIG. 4 is message flow diagram illustrating message flows in a GSM network wherein a mobile station reselects to a WLAN in accordance with an embodiment.

Returning to networks employing GSM GPRS, FIG. 4 illustrates an embodiment wherein a mobile station 400 may handover from the GPRS network to a WLAN. At an architectural level, a WLAN may interact with a cellular network in several different ways. For the embodiments, there are three connectivity models that may be applied for the packet switched domain.

In a first embodiment, a WLAN network may appear to be a 3GPP™ cell or routing area (RA). Further, a group of WLANs may appear to a 3GPP™ network as a single RA. For example, a WLAN may connect to the 3GPP™ network via the Packet Switch domain. If the WLAN is communicating directly with another cellular user within the 3GPP network, then the appropriate WLAN link layer provides adequate connectivity. Thus a mobile station would change RAs when moving between the GPRS network and one of the WLANs.

In a second embodiment, a WLAN may communicate with another WLAN through the 3GPP™ network where the GTP tunneling protocol is utilized within the 3GPP network.

In a 3rd third embodiment, a WLAN may communicate through the Internet to a mobile station on the 3GPP™ network. In this case, the WLAN is not connected directly to the 3GPP™ network and therefore some 3GPP™ based functionality is limited or not available in this scenario. In this case, a mobile station may roam between WLANs that are in different RAs.

Returning to FIG. 4, a so-called "hard handoff" from a 3GPP™ network to a WLAN is depicted. For this embodiment the "reselect pending" 415 is an indication that a switch from a 3GPP™ network to a non-cellular access point will occur, specifically a WLAN access point. The "OK to Reselect" message 423 is the key to initiate the handoff. The handoff duration may be long or short, since the message exchange for the hard handoff in this sequence is much lengthier than the case of cell-to-cell handoff. In this embodiment, an event may be sent to call participant mobile stations to make them aware of a pending change to call quality that may occur due to the pending handoff.

Figure 5:
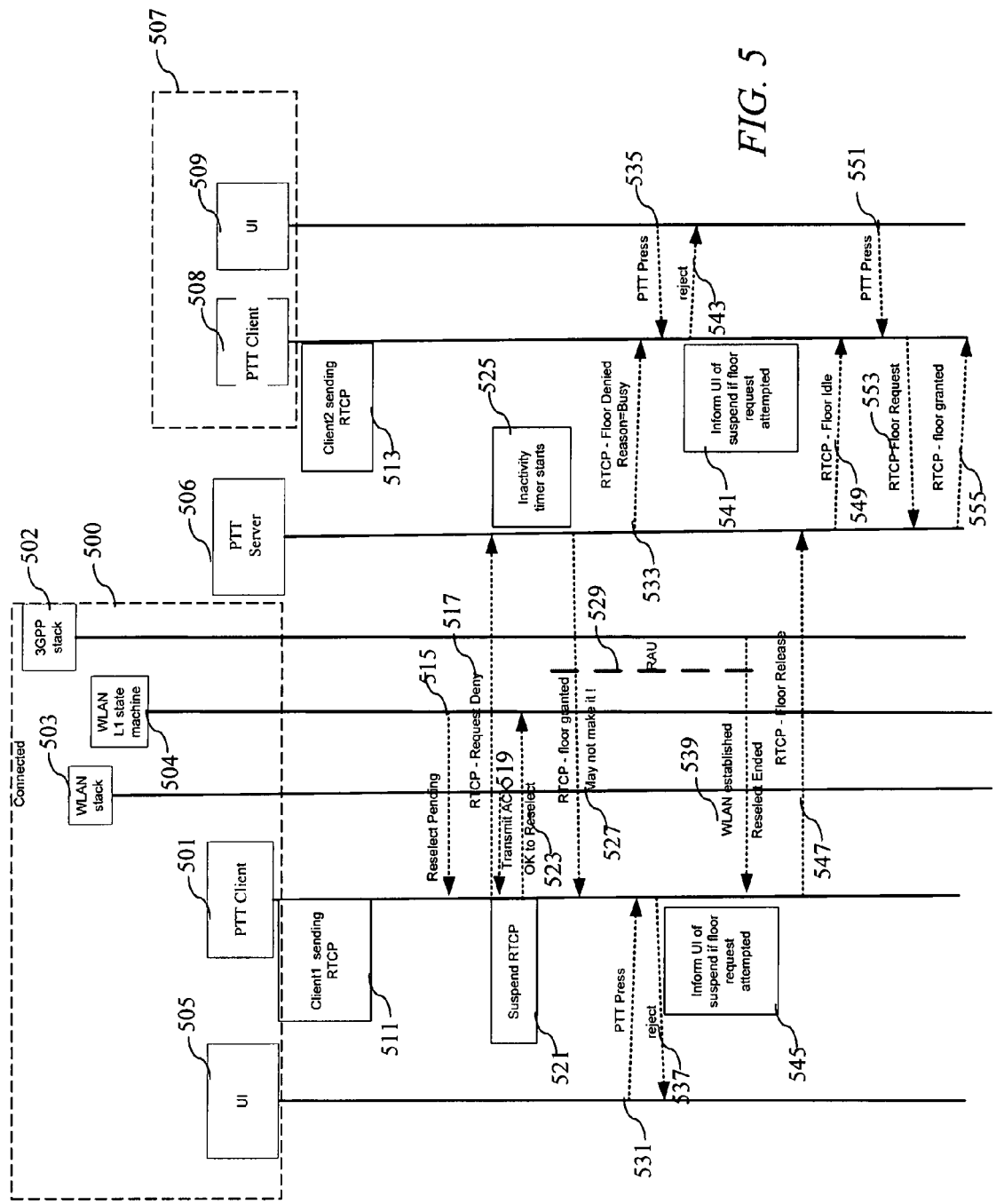
FIG. 5 is message flow diagram illustrating message flows in a GSM network wherein a mobile station reselects from the WLAN back to the GSM network in accordance with an embodiment.

Similarly, FIG. 5 depicts the reverse case, that is, hard handoff from the WLAN to the 3GPP ™ network. Handling of user awareness of the handoff from WLAN to 3GPP™ networks is more critical here because the mobile station is transitioning from a much higher bandwidth media, the WLAN, to a lower bandwidth media, the cellular network.

Thus for the various embodiments discussed above a PTT mobile station engaged in a PTT call, either talking or listening, detects certain anticipated conditions, such as RAU/LAU and impeding cell changes, that will cause a short term outage on the packet data connection such as, but not limited to, GPRS connections, or CDMA packet data connections. The mobile station will react in less than one second; preferably between 100 to 200 milliseconds.

When this condition occurs for the talking party, the talking party's mobile station will send a request deny message to a PTT server, before the data outage occurs. The PTT server will waits up to a configurable time period, preferably between 4 to 5 seconds, to see if the mobile station reappears on the new cell, the handover target cell. If the mobile station reappears, then all is well. If the mobile station does not reappear, then the PTT server will release the floor. The PTT server may have a configurable option to deny the floor to all mobile stations, until the original mobile station reappears on a new cell.

When this condition occurs for the listening party, the listening party's mobile station will likewise send a request deny message to the PTT server before the outage occurs. The PTT server will wait up to configurable time period, preferably between 4 to 5 seconds, to see if the mobile station reappears on the new cell. In the interim the PTT server may have a configurable option to send a warning tone to the talking party mobile station that a listening party mobile station is having problem. If the listening party mobile station reappears, then all is well. If the listening party mobile station does not reappear, then the PTT server will release the floor from the talking party mobile station. The PTT server may have a configurable option to deny the floor to all mobile stations, until the original mobile station reappears on a new cell as is the case for the talking party mobile station scenario.

Returning to the GPRS embodiments, various timers are defined in both PTT server and PTT client that have established values based on overall experience by those skilled in the art. However, specific for implementing the various embodiments it may be preferable for some timer values to be different in order to improve user experience. The timers that may be revised for the various embodiments include T4, T2, and T13. The T4 timer is a server side inactivity timer that is restarted for each received RTP frame on a connection. Expiration of T4 indicates no communication, and the PTT server default value is 30 seconds. The T2 timer is a "Stop talking" timer on the server side and is restarted for each received RTCP frame from a client device such as a mobile station. The T2 default setting is 30 seconds. The T13 timer is a Media timer on the server side and is restarted for each received RTCP frame on a connection. Expiration of T13 means no communication, and a mobile station normally returns to idle screen upon its expiration. The T13 time should be set to the same value as the T1 media timer on the client. The T13 timer has a default setting of 4 settings.

Figure 6:
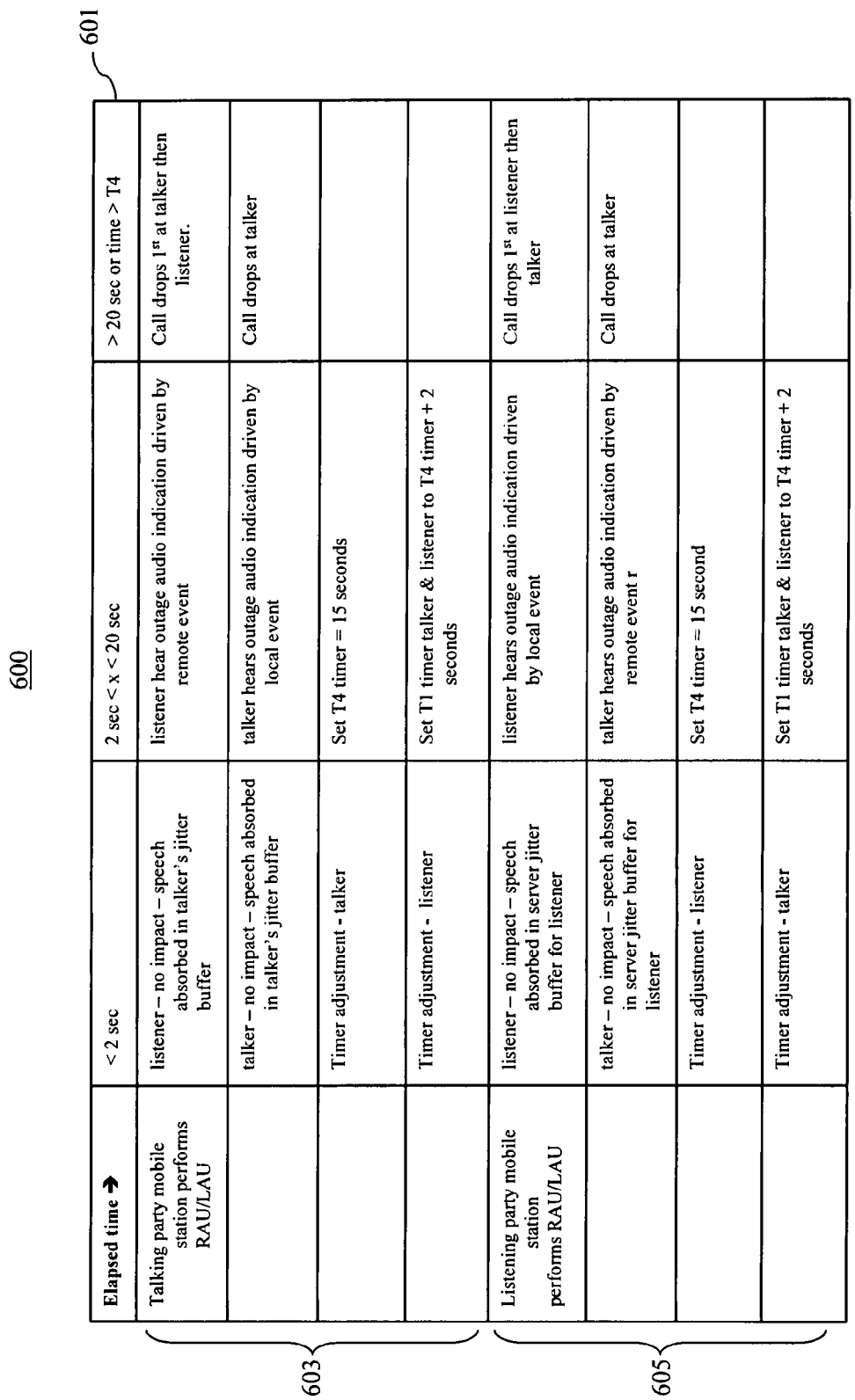
FIG. 6 is a table providing timer settings for PTT clients and servers appropriate for the various embodiments employing GPRS.

Table 600 in FIG. 6 provides recommended timer settings and actions to be performed based on the length of the anticipated data outage. As previously discussed this table is applicable for GPRS embodiments, and may require different value for other technologies of the various embodiments. Thus in FIG. 6, row 601 represents elapsed time where "x" is the duration of a data outage. Rows 603 relate to the talking party mobile station undergoing a RAU/LAU, while rows 605 relate to listening party mobile station undergoing a RAU/LAU.

For the various embodiments utilizing RTCP, further details are now described with respect to the "Talk Burst Control Protocol" (TBCP) as utilized in PTT systems. In the embodiments, a "Talk Burst Error Release" message is defined which modifies the "Talk Burst Release" message.

Thus the TBCP Talk Burst Error Release message, like the Talk Burst Release message, may be sent from a PTT client of a mobile station, when the mobile station has permission to send a Talk Burst (that is, the mobile station has the floor and is in the talking state) to a controlling PTT server to inform it that the mobile station is anticipating a data outage that may or may not be short lived. The Talk Burst Error Release message may also be sent by a mobile station that does not currently have the floor, specifically, a mobile station in the listening state.

The Talk Burst Error Release message is a bit map message that preferably has the bit pattern "10000" in the subtype field, however any appropriate indication may be used. The message's application-dependent data field consists of 4 octets in which the first 16 (0 to 15) bits provide the sequence number of the last RTP-packet in the Talk Burst, bit 16 is the "Ignore Sequence Number" field, and the last 15 (17-31) bits in the application-dependent data field are padding and set to zero. The PTT server will ignore the value of the padding bytes.

If the PTT client on the mobile station does not populate the sequence number of the last packet field with a correct sequence number, the PTT client will set the Ignore Sequence Number field to 1. If the Ignore Sequence Number field is set to 1, the controlling PTT server will ignore the sequence number of the last packet field since the mobile station has not populated the sequence number of the last packet field with a correct value. Note that the Ignore Sequence Number field is useful for mobile stations that utilize radio bearers that prohibit the possibility of keeping track of the RTP sequence number of the speech packets, such as is the case for CDMA2000 network. The Talk Burst Error Release message length field is set to three, and the SSRC field carries the SSRC of the mobile station having the floor.

Also in the various embodiments, the TBCP Talk Burst Request Queue Status Response message is expanded such that bit padding is replaced by the following 2 bit "state" field where: "01xxxxx" indicates that no one has the floor; "02xxxxx" indicates that the requester is still in the listen state; and "03xxxxx" indicates that the requester is still in the talking state. Because only the padding bits are modified, the message as defined in the embodiments is backward compatible.

Another message defined for the various embodiments is a "talk burst error release MSC" which is also an RTCP based message. This message is defined similar to the Talk Burst Release message described above, except that it will have new "subtype=0x1000."

The various scenarios that may be handled by the embodiments employing the above messages are illustrated by FIGS. 7 through 9. FIG. 7 illustrates the case of a mobile station in a talking state that is anticipating a RAU. The mobile station PTT client A 701 sends its last RTP Media packet 703 to the PTT Server A 700 which is the controlling server, and the PTT server A 700 forwards the packet to the listening clients such as PTT client B 702. After the last RTP packet has been sent by the PTT client A 701, the RAU anticipated error condition occurs in 705 and the PTT client A sends a TBCP Talk Burst Error Release message 707 as described above to the PTT server 700 to inform it that the Talk Burst is unexpectedly halted due to an anticipated error which in this case is caused by the RAU. The message includes the sequence number of the last RTP Media packet.

The PTT server A 700, after a configurable delay, sends the TBCP Talk Burst Error Release message 707 to the listening PTT client B 702. The PTT client B 702 may perform any of several configurable actions such as, but not limited to, playing a special tone to inform the mobile station user that the talker is having trouble.

FIG. 8 illustrates a scenario where a RAU anticipated occurs for a PTT client in the listening state. In FIG. 8, the PTT client B 802 experiences an anticipated outage while listening. Here the PTT client A 801 again sends the last RTP Media packet 803 to the controlling PTT server 800, which forwards the packet to PTT client B. After the last RTP packet 803 has been received by the PTT client B 802, a RAU anticipated error condition occurs as in 805, and the PTT client B 802 sends a TBCP Talk Burst Error Release message to the PTT Server 800, informing it that listening to Talk Bursts is not possible due to an anticipated RAU error. The message includes the sequence number of the last RTP Media packet, as is the case illustrated in FIG. 7 previously. The PTT server 800, after a configurable delay, sends the TBCP Talk Burst Error Release message 807 to PTT client A 801, and the PTT client A 801 may perform a configurable action as described with respect to FIG. 7, for example, playing a special tone to inform the mobile station user that the listener in this case is having trouble. Further for this case, the PTT client A 801, having the floor, may unconditionally release the floor.

FIG. 9 illustrates recovery after anticipated RAU error conditions illustrated by FIG. 7 and FIG. 8 have ended as in 903. For this case, the standard TBCP Talk Burst Request Queue Status Request message may be used without modification. However, the response "TBCP Talk Burst Request Queue Status Response message" is expanded in the embodiments by redefining the padding field as was discussed above. Thus in FIG. 9, the PTT client A 901 sends the RTP request current talk/listen state message 905 to the controlling PTT server A 900. The PTT server 900 then sends the last RTP Media packet 907 to the PTT client A 902. The PTT server A 900 also sends the talk burst state response message 909 to PTT client A 901 informing it of whether or not it still has the floor.

Some embodiments may employ Session Initiation Protocol (SIP) based messages for talk burst release, and therefore a SIP based talk burst release message in accordance with the embodiments will now be described.

For embodiments employing SIP, similar to the RTCP based embodiments, a "SIP UPDATE Talk Burst Error Release" message is sent as an action from the PTT client that has the floor, and thus has permission to send a Talk Burst, to the controlling PTT server to inform it that the Talk Burst is anticipating an outage of unknown duration. The SIP UPDATE Talk Burst Error Release may also be sent by a PTT client in the listening state. The SIP UPDATE Talk Burst Error Release message is sent via SDP protocol, preferably with the parameters "v=0" and "a=aerror=rau." For the parameter "a=aerror=rau," "aerror" represents "anticipated error," and "rau" specifies the type of anticipated error, which in this case is caused by the RAU. Other error types may be defined in accordance with the embodiments such that "a=aerror=nn" where "nnn" may be a LAU or some other condition causing a data outage or delay.

FIG. 10 illustrates the scenario of a talking state mobile station encountering a RAU anticipated release and using the SIP based talk burst release of the embodiments. Thus the PTT client A 1001 sends its last RTP Media packet 1005 to the controlling PTT server A 1000, which forwards the packet 1005 to the PTT client B 1003. The RAU condition occurs in 1007, and the PTT client A 1001 sends a SIP UPDATE Talk Burst Error Release message 1009, which includes the sequence number of the last RTP Media packet, to the PTT server A 1000 informing it that the Talk Burst is unexpectedly halted due to the anticipated RAU.

The PTT server 1000, after a configurable delay, sends the SIP UPDATE Talk Burst Error Release message 1009 to the PTT client B 1003 and the PTT client B 1003 perform any of several configurable actions such as playing a special tone.

The PTT server 1000 will then send a SIP 200 OK message 1011 in response to the SIP UPDATE Talk Burst Error Release message 1009. The SIP 200 OK message 1011 will be by the PTT server 1000 as soon as it accepts the SIP UPDATE Talk Burst Error Release message 1009 as valid. The PTT client B 1003 also sends a SIP 200 OK message 1013 in response to the SIP UPDATE Talk Burst Error Release message 1009.

Figure 11:
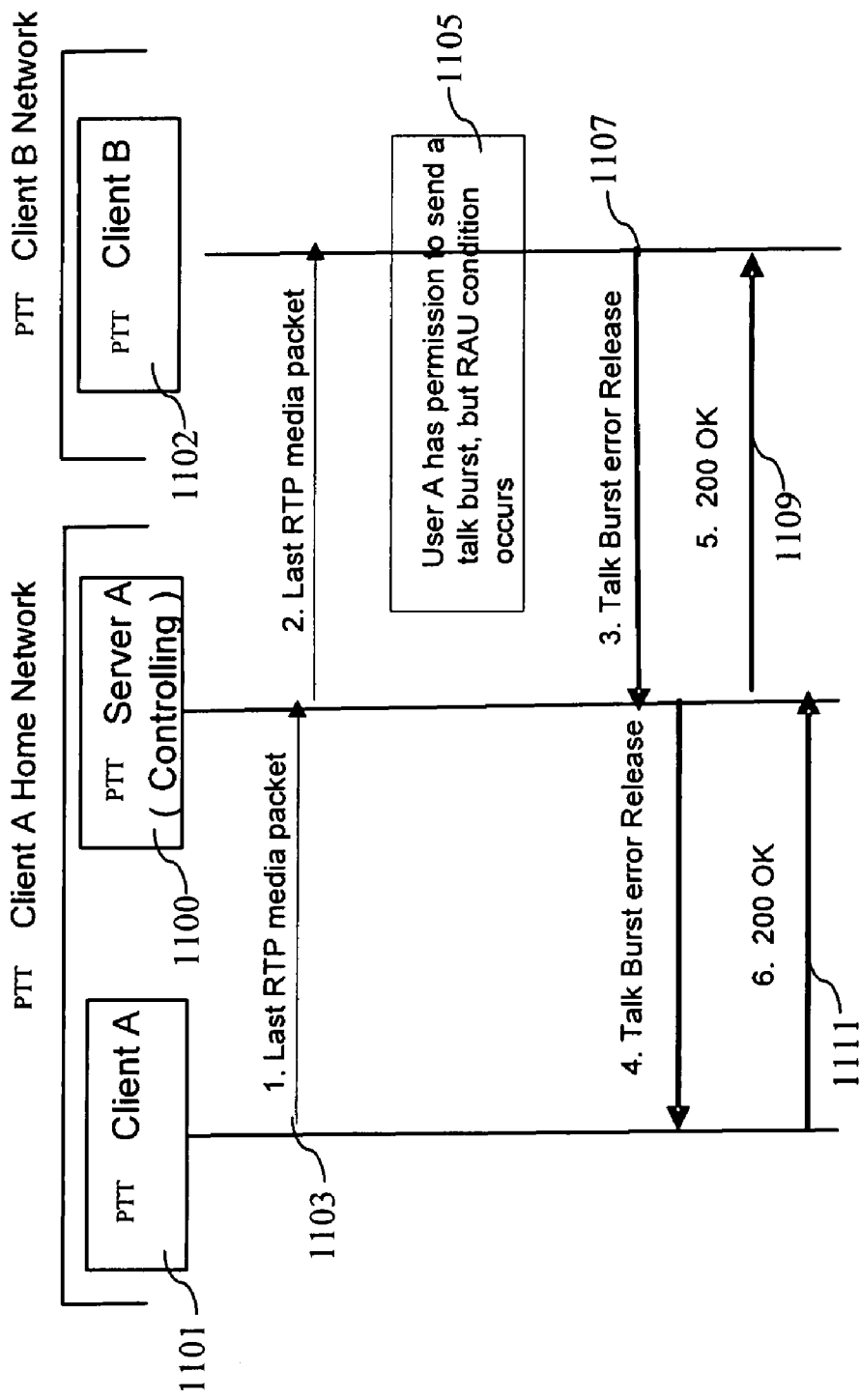
FIG. 11 illustrates the SIP based embodiment for a mobile station in the listening state.

FIG. 11 illustrates the case for a mobile station in the listening state. The PTT client A 1101 sends its last RTP Media packet to the PTT server A 1100 which forwards the packet 1103 to PTT client B 1102. The RAU condition occurs in 1105 and the PTT client B 1102 sends the SIP UPDATE Talk Burst Error Release message 1107 to the PTT server 1100. The PTT server implements the configurable time delay and, after the time expires, sends the SIP UPDATE Talk Burst Error Release message 1107 to PTT client A 1101. The PTT client A may then perform any of the several configurable actions as previously described. The SIP 200 OK messages 1109, 1111, are then sent in response to the SIP UPDATE Talk Burst Error Release message 1107 similar to the case illustrated and described with respect to FIG. 10.

Figure 12:
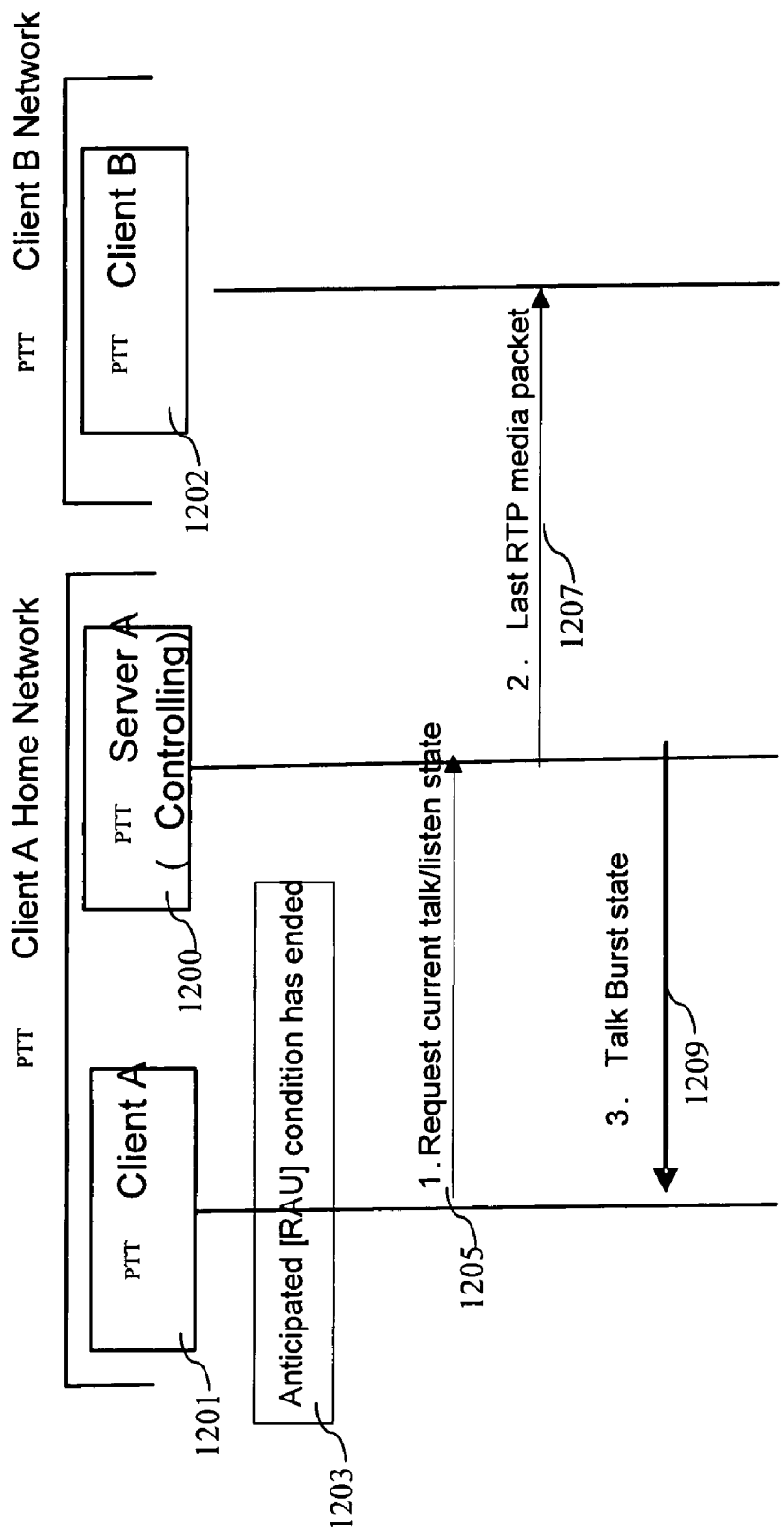
FIG. 12 illustrates recovery after the RAU condition for the SIP based embodiments.

FIG. 12 illustrates recovery after the RAU condition 1203 for the SIP based embodiments. Thus the PTT client A 1201 sends the RTP request current talk/listen state message 1205 to the PTT server 1200 which then sends the last RTP Media packet 1207 to the PTT client B 1202. The PTT server 1200 then sends the talk burst state message 1209 to the PTT client A 1201 informing it of whether or not it still has the floor.

Figure 13:
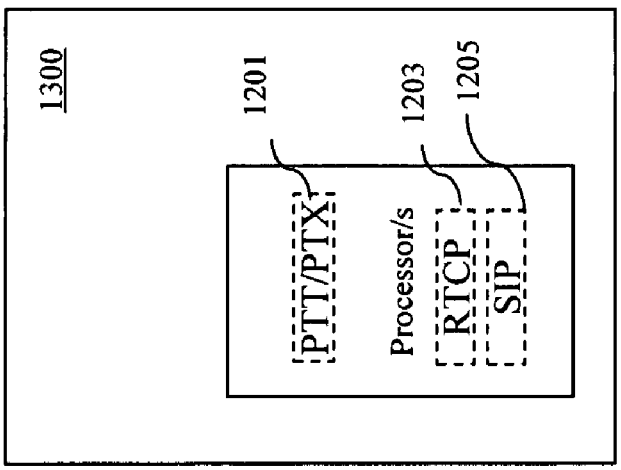
FIG. 13 illustrates the modules of a PTT/PTX server in accordance with the embodiments.

FIG. 13 illustrates the modules of a PTT/PTX server 1300 in accordance with the embodiments. In addition to a PTT/PTX module 1201 capable of implementing the messaging in accordance with the embodiments described above, the PTT/PTX server 1300 also comprises an RTCP module 1203 and a SIP module 1205 capable of sending and receiving the various messages in accordance with the embodiments.

Figure 14:
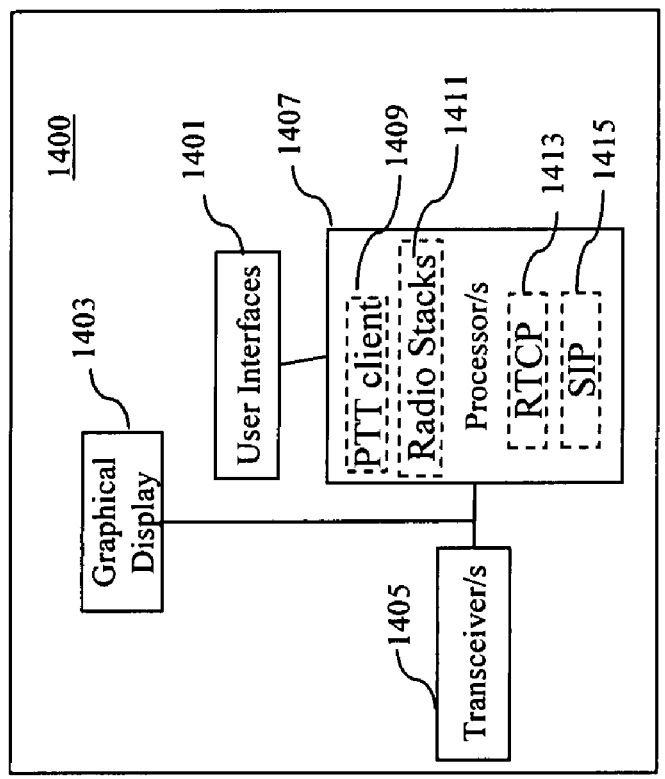
FIG. 14 illustrates the modules of a mobile station in accordance with the embodiments.

FIG. 14 illustrates a mobile station 1400, which comprises components as know by those of ordinary skill such as, but not limited to, user interfaces 1401, graphical display 1403, transceiver/s 1405, and processor/s 1407. In addition, the mobile station 1400 comprises a PTT client 1409, an RTCP module 1413 and/or a SIP module 1415, all of which are capable of implementing the various messages described herein for the various embodiments.

While various embodiments have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method in a mobile station, said mobile station being engaged in communication session via a Push-to-talk (PTT)/Push-to-X (PTX) communication server, the method comprising:
    monitoring a set of data outage precursors, said precursors corresponding to procedures comprising cell handover procedures, Routing Area Update (RAU) procedures, and Location Area Update (LAU) procedures;
    receiving an indication that at least one of said precursors is initiating or is anticipated, in response to said monitoring; and
    sending a message to said PTT/PTX communication server before said data outage occurs, in response to receiving said indication, said message for indicating an anticipation that said mobile station will commence a network related operation, wherein the network related operation is at least one of the cell handover, the Routing Area Update (RAU), or the Location Area Update (LAU).

2. The method of claim 1, wherein said method further comprises:
    receiving, by the communication server, from the mobile station the message, said mobile station being coupled to a network and participating in the communications session with at least a second mobile station via said communications server;
    setting, by the communication server, a timer for a predetermined time period, in response to receiving said message, said predetermined time period determining a waiting period for waiting for an indication that said mobile station has completed said operation; and
    sending, by the communication server, a warning indication to the at least a second mobile station participating in said communications session, said warning indication for indicating that said mobile station is experiencing a data outage.

3. The method of claim 2, further comprising:
receiving a timeout indication from said timer; and
releasing a floor from said mobile station.

4. The method of claim 2, further comprising:
receiving a floor request message from said second mobile station;
denying said floor request;
receiving said timeout indication;
releasing a floor from said mobile station; and
granting a subsequent floor request from said second mobile station.

5. The method of claim 1, further comprising:
receiving a floor request message from said second mobile station;
denying said floor request;
receiving said indication that said mobile station has completed said operation; and
granting a subsequent floor request from said second mobile station.

6. The method of claim 1, wherein receiving from a mobile station a message, further comprises receiving a Real Time Control Protocol message.

7. The method of claim 6, further comprising:
receiving said indication that said mobile station has completed said operation;
informing said second mobile station by sending said second mobile station a Real Time Control Protocol message.

8. The method of claim 1, wherein receiving from a mobile station a message, further comprises receiving a Session Initiation Protocol message.

9. The method of claim 8, further comprising:
receiving said indication that said mobile station has completed said operation;
informing said second mobile station by sending said second mobile station a Session Initiation Protocol message; and
receiving in response to said Session Initiation Protocol message, from said second mobile station, a Session Initiation Protocol 200 OK message.

10. The method of claim 9, further comprising:
receiving a state request message from said mobile station;
sending a last communication packet from said mobile station to said second mobile station; and
providing a state information to said mobile station in response to said state request message.

11. The method of claim 1, further comprising:
receiving from said communication server, a warning tone indicating that at least a second mobile station listening to transmissions from said mobile station, via said communication server, is experiencing a data outage.

* * * * *